United States Patent
Hansen (10) Patent No.: US 10,733,651 B2
(45) Date of Patent: Aug. 4, 2020

(54) METHODS AND SYSTEMS FOR IDENTIFYING PHYSICAL OBJECTS

(71) Applicant: Andrew S Hansen, Bountiful, UT (US)

(72) Inventor: Andrew S Hansen, Bountiful, UT (US)

( * ) Notice: Subject to any disclaimer, the term of this patent is extended or adjusted under 35 U.S.C. 154(b) by 1417 days.

(21) Appl. No.: 14/588,902

(22) Filed: Jan. 2, 2015

(65) Prior Publication Data

US 2015/0248719 A1     Sep. 3, 2015

Related U.S. Application Data

(60) Provisional application No. 61/922,863, filed on Jan. 1, 2014.

(51) Int. Cl.
*G06Q 30/06*      (2012.01)
*G06Q 50/00*      (2012.01)
*G06F 3/01*       (2006.01)
*G06F 3/03*       (2006.01)

(52) U.S. Cl.
CPC ......... *G06Q 30/0627* (2013.01); *G06F 3/017* (2013.01); *G06F 3/0304* (2013.01); *G06Q 30/0643* (2013.01); *G06Q 50/01* (2013.01)

(58) Field of Classification Search
CPC .......................... G06Q 30/06; G06Q 30/0629
See application file for complete search history.

(56) References Cited

U.S. PATENT DOCUMENTS

| | | | |
|---|---|---|---|
| 7,565,139 B2 | 7/2009 | Neven | |
| 7,593,740 B2 | 9/2009 | Crowley | |
| 8,600,120 B2 | 12/2013 | Gonion | |
| 8,655,053 B1 * | 2/2014 | Hansen | G06Q 10/10 382/154 |
| 8,908,928 B1 | 12/2014 | Hansen | |
| 9,424,461 B1 * | 8/2016 | Yuan | G06K 9/00201 |
| 9,696,897 B2 * | 7/2017 | Garcia | G06F 3/0487 |
| 2007/0142177 A1 | 6/2007 | Clifford | |
| 2010/0011081 A1 | 1/2010 | Crowley | |
| 2010/0188503 A1 | 7/2010 | Tsai | |
| 2011/0164163 A1 | 7/2011 | Bilbrey | |
| 2011/0267578 A1 | 11/2011 | Wilson | |
| 2011/0307801 A1 | 12/2011 | Sherman | |
| 2012/0254760 A1 | 10/2012 | Meeker | |
| 2013/0069985 A1 | 3/2013 | Wong | |

(Continued)

FOREIGN PATENT DOCUMENTS

WO    WO2014/147149 A1    9/2014

OTHER PUBLICATIONS

Brooks, Rodney A. "Symbolic reasoning among 3-D models and 2-D images." Artificial intelligence 17.1-3 (1981): 285-348 (Year: 1981).*

(Continued)

*Primary Examiner* — Michelle T Kringen
(74) *Attorney, Agent, or Firm* — Alpine IP PLLC (57) ABSTRACT

The systems and computer implemented methods receive image data with reference objects and target objects in the imagery. The reference object is identified from the image data and database information associated with the reference object is obtained (e.g., the actual size of the reference object). The database information associated with the reference object can then be used to identify and/or size the target object.

12 Claims, 6 Drawing Sheets

(56) References Cited

U.S. PATENT DOCUMENTS

2013/0215116 A1* 8/2013 Siddique ............ G06Q 30/0643
345/420
2013/0335416 A1 12/2013 Coon

OTHER PUBLICATIONS

U.S. Appl. No. 61/549,212, filed Jan. 18, 2012, Hansen.
Huanghao Xu,"Measuring Accurate Body Parameters of Dressed Humans with Large-Scale Motion Using a Kinect Sensor," Sensors 2013, 13, 11362-11384.
Alexander Weiss, "Home 3D Body Scans from Noisy Image and Range Data," 2011 IEEE International Conference on Computer Vision (ICCV), Nov. 6-13, 2011.
Daniel Grest, "Human Model fitting from monocular posture images," Proc. Vision, Modeling, Visualization, 2005.
Gordon Wan, "CMOS Image Sensors With Multi-Bucket Pixels for Computational Photography," IEEE Journal of Solid State Circuits, vol. 47, No. 4, Apr. 2012.
Infinion Technologies, "Infineon 3D Image Sensor," product brochure, May 2013.
Richard Newcombe, "KinectFusion: Real-Time Dense Surface Mapping and Tracking," Microsoft Research, available at least as early as Oct. 28, 2011, Imperial College, London.

* cited by examiner

Fig. 1

| | Database 300 | | | | | | |
|---|---|---|---|---|---|---|---|
| 3D Data 310 | Object ID 312 | | | Object Info 314 | Associated Objects 316 | | |
| | Name | Type | Category | | Name | Type | Category |
| File 1 (318) | Nike Zoom 5.0 | Shoe | Footwear | www.runningwarehouse.com<br>www.roadrunners.com<br>$90<br>Weight 6.7 oz | Henriksdal<br>Nike no shows<br>R gear Compression Socks | Chair<br>Socks<br>Socks | Furniture<br>Sportswear<br>Sportwear |
| File 2 (320) | Henriksdal | Chair | Furniture | www.ikea.com<br>$99<br>Width: 21 1/4 "<br>Depth: 22 7/8 "<br>Height: 38 1/4 "<br>Seat width: 21 1/4 "<br>Seat depth: 16 1/2 "<br>Seat height: 18 1/2 " | Nike Zoom 5.0<br>Nomas | Shoe<br>Table | Footwear<br>Furniture |
| File 3 (322) | Trek Superfly | Mt. Bike | Adult Bikes | www.trek.com<br>www.bikerader<br>$2,000.00<br>Made By Trek<br>Available in sizes: 15.5in 17.5in 18.5in 19.5in 21.5in 23in | Pearl Izumi X-Alp Drift | Biking Shoes | Biking Gear |
| File 4 (324) | 5 speed Hand mixer | Mixer | Kitchen appliances | Made by Kitchen Aid<br>www.target.com<br>www.walmart.com<br>$50<br>Features: 5-speed, Lightweight Housing, Beater Ejection Button, Comfort grip handle, Variable Speed, Adjustable Speed Control | CHEFS Stoneware Mixing Bowls | Mixing Bowls | Kitchen accessories |

METHODS AND SYSTEMS FOR IDENTIFYING PHYSICAL OBJECTS

CROSS-REFERENCE TO RELATED APPLICATIONS

This application claims the benefit of U.S. Provisional Patent Application Ser. No. 61/922,863, titled "Methods and Systems For Identifying Physical Objects and Performing Searches of Same," filed Jan. 1, 2014, which is hereby incorporated herein by reference in its entirety.

BACKGROUND

1. Field of the Invention

The present invention relates to methods for identifying objects or their features using image data.

2. Related Technology

Traditionally knowledge about the goods and services available at a local establishment (i.e., a businesses) has been provided by word of mouth, advertising, or the yellow pages. With the internet, many businesses describe their goods and services on webpages. This information has provided a wealth of knowledge about goods and services available. However, a large percentage of the businesses either don't provide all the desired information or provide no information at all. In addition, this information can change over time. Thus, there exists a need to obtain local information.

DETAILED DESCRIPTION

Computer Network

Figure 1:
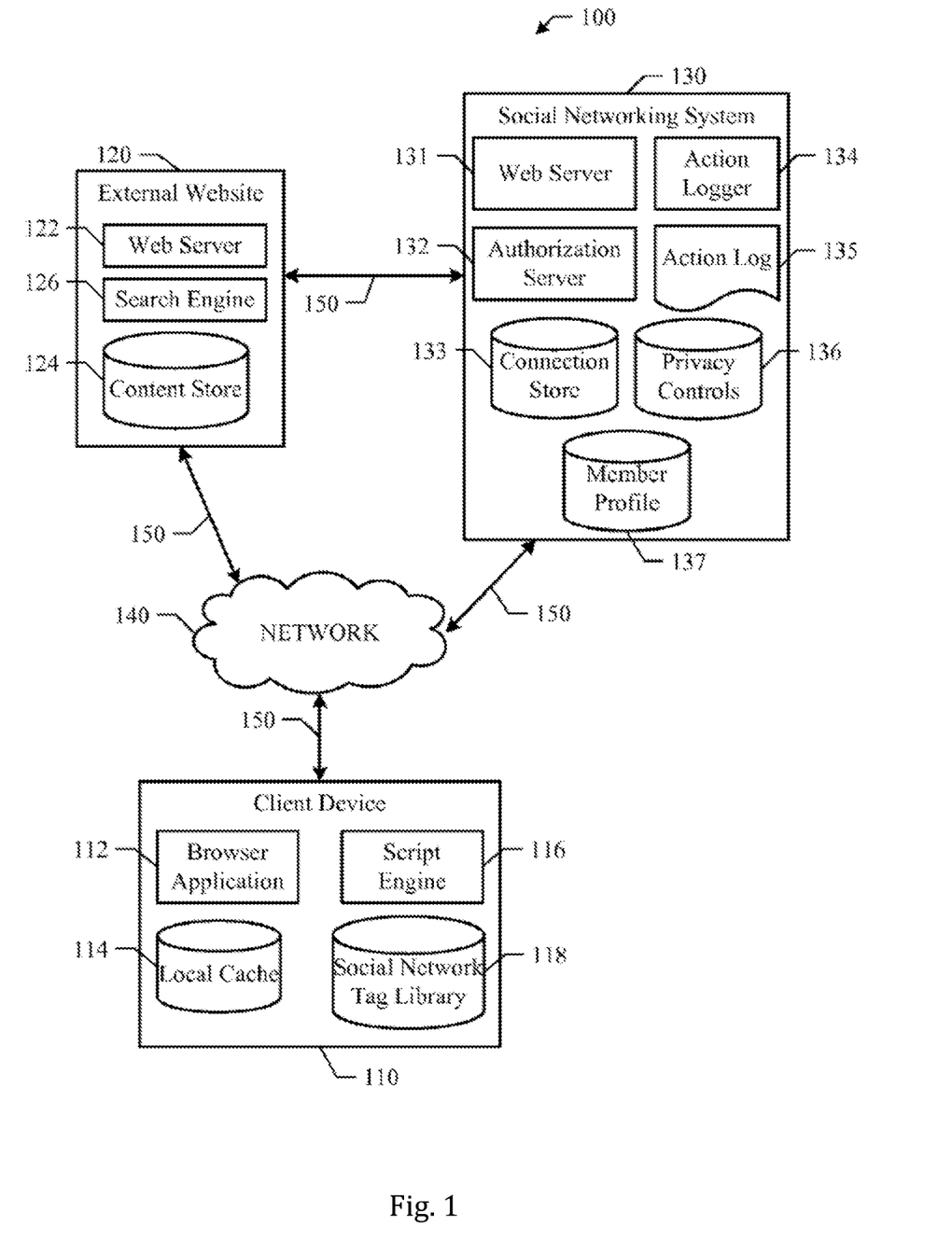
FIG. 1 describes a computer network.

FIG. 1 illustrates a particular embodiment of a system that includes a client device 110, an external website 120, and a social networking system 130. In particular embodiments, links 150 illustrate interactions between client device 110 and external website 120, between client device 110 and social networking system 130, and between external website 120 and social networking system 130.

Client device 110 is generally a computer or computing device including functionality for communicating over a computer network (e.g., remotely). Client device 110 may be a desktop computer, laptop computer, personal digital assistant (PDA), in- or out-of-car navigation system, smart phone or other cellular or mobile phone, or mobile gaming device, among other suitable mobile computing devices. Client device 110 may execute one or more client applications, such as a web browser (e.g., Microsoft Windows Internet Explorer, Mozilla Firefox, Apple Safari, Google Chrome, and Opera, etc.), to access and view content over a computer network.

In particular embodiments, client device 110 may host a browser application 112 or other application that processes structured documents. In particular embodiments, client device 110 may have received one or more structured documents from external website 120 and/or social networking system 130. In particular embodiments, the structured document may be a markup language document that contains text, links, scripts, and other attributes, such as API calls identifying social network data elements of a user profile maintained by social networking system 130. In particular embodiments, the structured document may contain instructions, for example, to specify how to render content for display at client device 110. In particular embodiments, the structured document may contain instructions, for example, on how to access additional information from social networking system 130. Alternatively, the instructions within structured document may contain program logic interpreted by a scripting engine 116 on the client device 110.

In particular embodiments, browser application 112 may process the markup language in the structured document and render the structured document as a displayable web page. In particular embodiments, the displayable web page may include content of the external website 120 as well as one or more of the located social network data elements of the social networking system 130. In particular embodiments, browser application 112 may display the rendered web page on a display of client device 110. For example, a structured document hosted by external website 120 may contain an API call for a profile picture of a user. The browser application 112, when processing the structured document, may transmit a request to social networking system 130 to retrieve the user's profile picture. The request may be an HTTP request and may further include a browser cookie with information identifying the user of social networking system 130. The browser cookie may include state and other information indicating the status of the user, for example, whether the user has recently logged in and/or authenticated to the social networking system 130. Still further, the structured document provided by external website 120 may include a segment (such as a div or iframe) that prompts the user to log in to social network system 130. For example, the structured document may include HTML code, Javascript and other controls that cause the browser hosted by client device 110 to access social networking system 130 and render a login interface in a section of the displayed structured document.

In particular embodiments, external website 120 may be any website accessible on the Internet, and may have various formats, such as, for example and without limitation, text, audio, video, images, web pages, documents, executables, etc. In particular embodiments may be computer-implemented tool for locating desired information throughout the internet, such as search engine 126. Some of the most common search engines are search engines provided by Microsoft™. Inc. (http://www.bing.com), Yahoo™ Inc. (http://search.yahoo.com), and Google™ Inc. (http://www.google.com). In particular embodiments, external website 120 and its contents may be stored at many different sites, such as on computers and servers, in databases, etc., around the world, as illustrated by content store 124. In particular embodiments, the information that search engine 126 seeks to locate may be in content store 124, on social networking system 130, or on many different sites, such as on computers and servers, in databases, etc., around the world as well. These different sites are communicatively linked to the Internet through various network infrastructures and the Uniform Resource Locator (URL) of external website 120 specifies where the corresponding documents are located and the mechanism for retrieving them. Any person may access the publicly available external website 120 or its contents via a suitable network device (e.g., a computer, a smart mobile telephone, etc.) connected to the Internet.

In particular embodiments external website 120 and social networking system 130 may have one or more users or members. In particular embodiments, users of external website 120 may also be users of social networking system 130. In particular embodiments, a user may interact with external website 120 and/or the social networking system 130 using client device 110. In particular embodiments, the social networking system 130 may keep user profile information and the connections among the users.

In particular embodiments, the social networking system 130 may receive requests from either the external website 120 or the client device 110 to which the social networking system 130 may respond with the requested information or with a subset of the requested information. Particular interactions between client device 110, the external website 120, and the social networking system 130 and information exchanged between the three systems will be described later in detail. Some embodiments of the invention may be carried out on just the social networking system 130, the client device 110, or the external website 120 or may be carried o using any combination of these elements and/or in a combination that uses more than one of each of these elements (e.g., two or more social networking systems or two or more external websites 120). As discussed in more detail below, implementations of the invention include enhanced search results from posting a search result, a search query, or a link to a search result in a social network so as to obtain social network views and/or feedback regarding the search result post.

In particular embodiments, social networking system 130 may include a web server 131, an authorization server 132, an action logger 134, an action log 135, a connection database 133, a privacy controls database 136, and member profile database 137. In particular embodiments, social networking system 130 may include additional, fewer, or different modules for various applications. Conventional components such as network interfaces, security mechanisms, load balancers, failover servers, management and network operations consoles, and the like are not shown so as to not obscure the details of the system. In particular embodiments, the social networking system 130 comprises a computing system that allows users to communicate or otherwise interact with each other and access content as described herein.

In particular embodiments, the social networking system 130 stores user profile data and social graph information in member profile database 137. In particular embodiments, the social networking system 130 stores data describing one or more connections between different users in the connection database 133. Particular embodiments of the connection database 133 may store connection information for users who have indicated similar or common work experience, group memberships, hobbies, or educational history. In particular embodiments, the social networking system 130 may also include user-defined connections between different users and those connections may be stored in connection database 133 as well. Particular embodiments of connection database 135 may allow users to specify their relationships with other users. In particular embodiments, for example, these user defined connections allows users to generate relationships with other users that parallel the users' real-life relationships, such as friends, relatives, co-workers, partners, and so forth. In particular embodiments, users may select from predefined types of connections, or define their own connection types, as needed.

In particular embodiments, the web server 131 links the social networking system 130 via the network 140 to one or more client devices 110. Network 140 generally represents a network or collection of networks (such as the Internet or a corporate intranet, or a combination of both) over which client devices 110 may access the external website 120 and the social network system 130. In particular embodiments, the web server 131 serves web pages, as well as other web-related content, such as Java, Flash, XML, and so forth. Particular embodiments of the web server 131 may include a mail server or other messaging functionality for receiving and routing messages between the social networking system 131 and the client devices 110. In particular embodiments, the messages may be instant messages, queued messages (e.g., email), text and SMS messages, or any other suitable messaging technique.

In particular embodiments, the action logger 134 is capable of receiving communications from the web server 131 about user actions on and/or off the social networking system 130. In particular embodiments, the action logger 134 populates the action log 135 with information about user actions in order to track them. More specifically, any action that a particular user takes with respect to another user is associated with each user's profile through information maintained in a database or other data repository, such as the action log 135. In particular embodiments, the actions taken by the members that are recorded in the action log 135 may be actions taken by the members on the social networking system 130 or actions taken by the members on the external website 120. In particular embodiments, the actions taken by the members on an external website 120 are communicated to the web server 131 and the web server 131 sends a request to the action logger 134 to record the actions in the action log 135. In particular embodiments, such actions may include, for example, adding a connection to the other user, sending a message to the other user, reading a message from the other user, viewing content associated with the other user, attending an event posted by another user, among others. Additionally, in particular embodiments, actions in connection with other objects may be directed at particular users, and these actions may be associated with those users as well.

In particular embodiments, when a user takes an action on the social networking system 130, the action is recorded in an action log 135. In particular embodiments, the social networking system 130 maintains the action log 135 as a database of entries. In particular embodiments, when an action is taken on the social networking system 130, the social networking system 130 adds an entry for that action to the action log 135.

In particular embodiments, a user of the social networking system may share media hosted by external websites with the social networking system and this action may be received by action logger 134 and stored in action log 135. In particular embodiments, external websites may have "share" buttons that are operative to transmit links to the content to the social networking system and post the links as wall post entries for a user profile. In particular embodiments, the buttons are operative to transmit activity stream entries to the social networking system, which will post the entry in a news feed. In particular embodiments, for example, a user can access a photo, a photo album, a video clip, or other media from a client device 110 and post links to that content on the wall associated with a user profile on social networking system.

In particular embodiments, privacy controls database 136 may store a user's privacy data for a user's settings for each user datum associated with the user and the user's settings for third party applications. For example, a user may have selected default privacy settings or a user may have specifically excluded certain entities from viewing a user datum or particular type of user data, and all of that privacy data for all users and friends of users may be stored in the privacy controls database 136.

In particular embodiments, a user's privacy data may comprise privacy settings associated with any aspect of the user profile, including changes that the user makes to the user profile, events, locations, media, activities, connections between one or more users, the news feed associated with the user or any other action that the user takes in the social networking system. In particular embodiments, the privacy settings associated with the privacy controls database 136 may be provided and stored at different levels of granularity. In particular embodiments, for example, the information to be shared may be specific information, such as, work phone number, or a set of related information, such as, personal information including several pieces of related information including profile photo, home phone number, and status. Alternatively, in particular embodiments, the privacy settings associated with the privacy controls database 136 may apply to all the information associated with the user in the social networking system. In particular embodiments, the specification of the set of entities that may access particular user information may also be specified at various levels of granularity. In particular embodiments, the user may specify any number of entities with which information may be shared. In particular embodiments, sets of entities with which information may be shared may include, for example, specified friends of the user, all friends of the user, all friends of friends, all applications, and all external systems. In particular embodiments, for example, the user may provide a list of external systems that may access certain information as well.

In particular embodiments, may specify a set of entities that includes exceptions that are not allowed to access the user's information. In particular embodiments, for example, the user of the social networking system may allow all external systems to access the user's work information but specify a list of external systems that are not allowed to access the work information. In particular embodiments, the list of exceptions that are not allowed to access certain information of the user may be a "block list." In particular embodiments, external systems belonging to a block list specified by a user of the social networking system are blocked from accessing the information specified in the privacy setting stored in privacy controls database 136. Particular embodiments contemplate various combinations of granularity of permitted access or denial of access depending on the type of user information and sets of entities with which information may be shared or accessed by the sets of entities, as specified by the user and stored in the privacy controls database 136.

In particular embodiments, the authorization server 132 enforces the privacy settings of the users of the social networking system, such as described above with respect to the privacy policy. In particular embodiments, the privacy setting of a user determines how particular information associated with a user may be shared. In particular embodiments, as described above, the privacy controls database 136 comprises the privacy data for a user's settings for each user datum associated with the user and the user's settings for third party applications. More specifically, the privacy data for a user's settings may specify particular information associated with a user and the entity or entities with whom the information may be shared. In particular embodiments, the entities with which information may be shared, may include users, third party applications, external websites, or any other entity that can potentially access the information. In particular embodiments, the information that may be shared by a user may comprise any aspect of the user profile, events, locations, media, activities, or the news feed associated with a particular social network user. Unless otherwise specified, this information is referred to herein as "social network content" or "social network data."

For purposes of this invention, social network information derived from social network content is referred to as social network analytics. The social network analytics are data that derive patterns or additional information from the social network content and are therefore not provided by the social network users.

Computer Implemented Searches

In some embodiments of the invention a user performs a search. The user performing the search is referred to herein as the search request user. The search request user provides terms to be used in a particular search (i.e., the search query). The search query is performed using a computer-implemented search engine and can be performed through the client device 110, an external website 120, or a social networking system 130.

A search engine is a computer-implemented tool designed to search for information relevant to specific subject matters or topics on a network, such as a social network, the Internet, the World Wide Web, or an Intranet. To conduct a search, a network user may issue a search query to the search engine. In the present invention the search query generally contains 3D imaging from a personal electronic device. The search query may also include one or more terms (words or phrases) that describe a subject or concept of interest. In response, the search engine may identify one or more network resources (i.e., an object in a database, web content, or social network data) that are likely to be related to the search query, which may collectively be referred to as a "search result" identified for the search query. The search result includes a plurality of network resources (i.e., a plurality of search result items) which are usually ranked and presented to the network user according to their respective degrees of relevance to the search query.

In some embodiments a web browser is used to access a webpage (or other structured document) for rendering at a client device. A web browser application is generally a computer program configured to run on a user's computing device (e.g., client device 110) that enables the user to connect to various server-hosted webpages available over a network. A non-exhaustive set of common web browsers include, by way of example, Chrome™ and Safari™. The web browser provides a standard viewing window that displays the informational and visual content of the webpage or website (the term "website" and "webpage" may be used interchangeably herein where appropriate). In particular embodiments, the browser processes the structured document and creates an in-memory representation of the document. The representation may be a Document Object Model (DOM) representation of the webpage. The web browser then renders the page in the particular client viewing window of the browser utilizing the DOM (or other suitable) representation.

Particular embodiments relate to a plug-in software application (hereinafter referred to as "social browser extension") that operates or executes in the context of a browser (e.g., a web browser) or other application client that consumes structured documents. In other implementations, the functionality described herein can be incorporated directly into a browser client application, as opposed to being a plug-in. In particular embodiments, the identity of a first user is known to the browser or plug-in through the plug-in itself or through the use of a connect application and the like.

Particular embodiments access, at a client device, a set of search results embodied in a structured document loaded into a client application (such as a browser client), wherein the search results correspond to a search query of the search request user. Sophisticated search engines implement many other functionalities in addition to identifying relevant network resources as a part of the search process. For example, a search engine usually ranks the network resources identified for a search query according to their relative degrees of relevance with respect to the search query, such that the network resources that are relatively more relevant to the search query are ranked higher and are presented to the network user before the network resources that are relatively less relevant to the search query. The search engine may also provide a short summary of each of the identified network resources.

The network resources used in the search (i.e., the data set used in the search) may be public social network data, private social network data, public non-social network data (e.g., web data), or private non-social network data. In some embodiments it may be desirable to search data that is non-social network data, social network data, or a combination. The percentage of the database being searched (as measured by number of search terms) that is private social network data is less than or equal to 50%, 40%, 30% 25%, 20%, 15%, 10%, 5%, 1%, or 0.1%, or greater than or equal to 50%, 40%, 30% 25%, 20%, 15%, 10%, 5%, 1%, or 0.1% or a range thereof.

In some embodiments, the percentage of the database (as measured by number of search terms) that is public, non-social network data is less than or equal to 50%, 40%, 30% 25%, 20%, 15%, 10%, 5%, 1%, or 0.1%, or greater than or equal to 50%, 40%, 30% 25%, 20%, 15%, 10%, 5%, 1%, or 0.1% or a range thereof. The network data may be stored and searched in the form of a keyword index.

The search may be performed through an external website 120 (e.g., a web search such as a Google search). In yet another embodiment, the search can be performed by on a social network (e.g., Facebook Graph Search, Yelp search). The data may be stored and searched on the client device 110. The search engines and social networks that can be used in the present invention include any websites that have a search box and any social network to which information can be posted by social network users. Examples of search engines and social networks include Google, Amazon, eBay, Facebook, Tumblr, Pinterest, Linkedin, Yelp, Foursquare, Apple iTunes, Pandora.

Identifying Physical Objects in an Image and Providing Database Information about the Object Some embodiments of the inventions described herein relate to creating 3D models of physical objects using imaging from a personal electronic device and/or creating databases of the objects and associating information with the object models or profiles of the objects identified by object models. The 3D database models and/or profiles of the models may be used in search to identify objects or categories of objects and provide additional information or search results based on the category or particular object identified. The objects can be any objects including any product sold or used in commerce (e.g., consumer goods, household items). In some embodiments, the object being identified is a non-unique object. Non-unique item are items produced in mass quantities and are substantially identical to one another in shape and function. Alternatively of in addition, the consumer good may be identified as being of a particular category of object (whether the particular object is non-unique or unique) (e.g., book, bike, flower, cup, etc).

Some embodiments of the invention relate to identifying objects from a 3D model captured from a personal electronic device. The 3D model generated from imagery captured by the portable electronic device may be compared to a database of known objects. The comparison matches features of the 3D model of the target object (i e, unknown object) with known features of known objects. In a preferred embodiment, the comparison includes comparing at least one three dimensional feature of the target object with a three dimensional feature of a known object. The database search can include scanning a plurality of identified three-dimensional features of the target object with known features of the object data stored in the database.

The 3D object modeling may be carried out using any system that uses an imaging sensor in a personal electronic device to capture objects in a natural environment. In some embodiments, the imaging may be carried out using a camera sensor of a personal electronic device and the personal electronic may be a smartphone or tablet computer. The personal electronic device may include a wireless radio and/or GPS and preferably includes a touch screen for displaying information and receiving touch input, including, but not limited to touch gestures (e.g., a movement on the screen surface).

The personal electronic device or a network connected server computer may receive image data and use feature extraction to extract a 3D model of the object from the image data. The image data can be captured using a single image sensor or a plurality of spaced apart image sensors. Alternatively, the 3D image data can be created from a light coding sensor (e.g., the IR and camera sensors available from PrimeSense such as but not limited to the Capri sensor). Light coding sensors use an infrared emitter that emits a particular IR pattern. The IR light is reflected off surfaces and an IR sensor measure distortions in the reflected pattern to calculate the three dimensional information of the surface. The light coding sensor may also include one or more camera sensors that detect visible light for detecting other features of an object such as color or texture. An example of another suitable imaging device in a portable mobile device is the Occipital camera that mounts to an iPad. In yet another embodiment, the 3D model may be created using a light field sensor or an image sensor with multi pixel or multi-bucket pixels, or other sensors that can measure light vectors. Additional information about light field sensors can be found in U.S. Ser. No. 61/549,212, which is hereby incorporated herein by reference.

The image sensor of the personal electronic device may be used to create a database of known objects, or may be used to identify objects in a search. When creating a database of known objects, the image sensor is used to capture image data that is used to create a dimensional model (including 3D data) that is stored in the database. The database may be a relational database or a non-relational database.

Each particular database entry (of an object) includes 3D data associated with object identification data that makes the object known (to a user), such as the name, category, or type of object. The 3D data provides matches in a search and the identification data identifies the object.

The database may include additional object information that provides information about the object that by itself is generally not sufficient to identify an object but is useful to the user. Examples of additional object information includes, but is not limited to, pricing, advertising, location of purchase, individuals that own or have searched for the item/object or other images with the item/object in it, user ratings of the item/object, merchant information, manufacturer information, and/or available copies of the object, etc.

Figure 2:
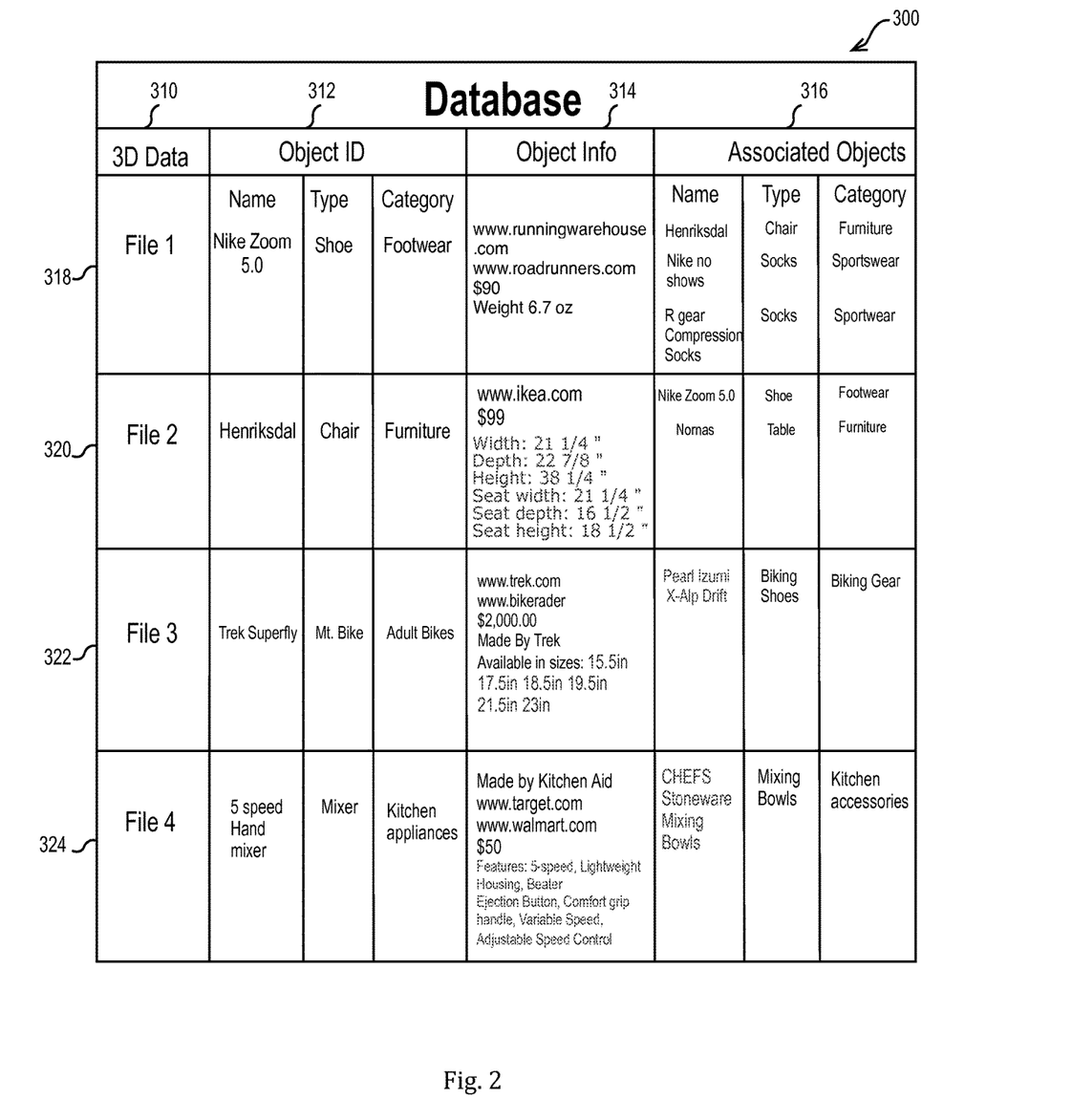
FIG. 2 describes a database.

FIG. 2 shows a database 300 with associated data. The associated data includes 3D data 310, object identification data 312, object information 314, and associated objects 316. 3D data 310 includes 4 entries shown in four rows 318, 320, 322, 324. Each row represents an entry for an object and its database information. The 3D data 310 is a file that stores the features of a 3D model that uniquely identify the real life object. The Object ID 312 provides identification information such as the name, type, and category of the target object (i.e., the file). for example, File 1 in row 318 has 3D data 310 for a "Nike Zoom 5.0" shoe. The object ID 312 in row 318 includes the name "Nike Zoom 5.0", the type of object "Shoe" and its category of object "Footwear." The object info 314 from row 318 includes information about the the Nike Zoom 5.0 shoe. The additional information may be selectable links or data. For example row 318 include links to online stores that sells the shoe and includes price information and weight information. Rows 320, 322, and 324 also include respective 3D data (files 2, 3, and 4) and object identification 312, and object information 314 for each respective object.

Figure 3:
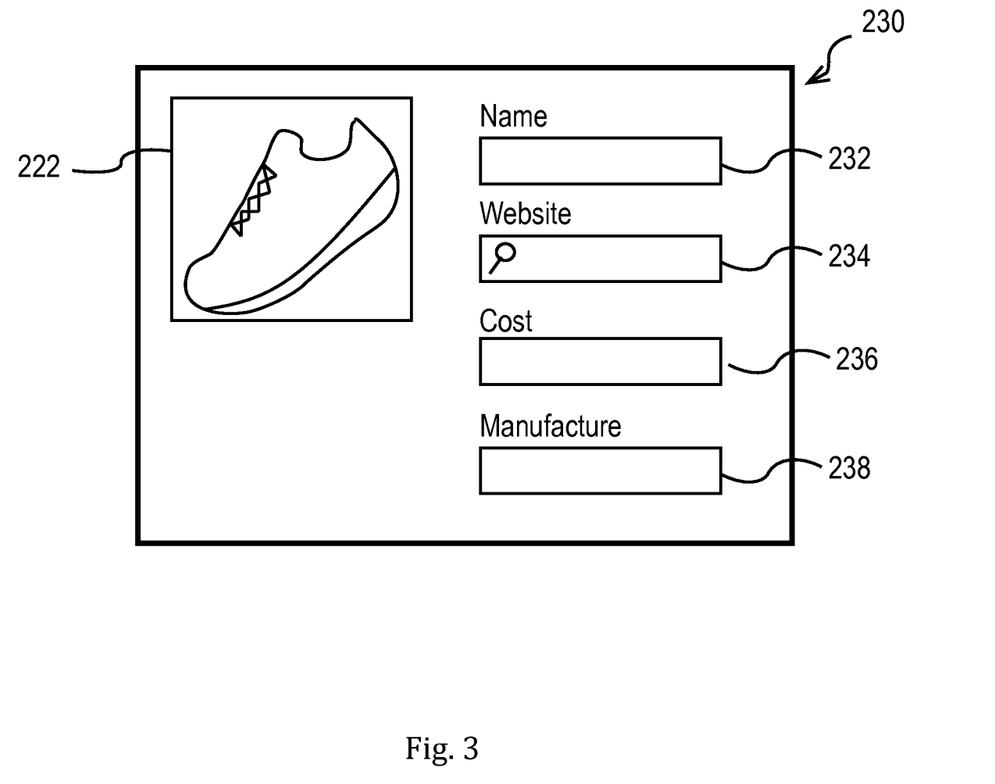
FIG. 3 describes a web document for inputting object identification and information.

Rows 318, 320, 322, and 324 also have data corresponding to an associated object. In real life, target objects often appear in association with some objects more often than others. As image data is analyzed for target objects, other objects in the image data can be identified and associated with the target object. For example, File 2 includes data regarding a chair, which frequently appears in pictures with shoes. Thus, row 318, which is a target object for shows may have associated objects data 316 that lists the name, type, and/or category of chairs. Row 318 also includes associated object data for socks. In some embodiments, the associated objects data 316 may be used to identify a particular target object. For instance, the associated objects data may be used to select or narrow search results to a particular name, type, or category of object. In some embodiments, the weighting in the search result may be derived at least in part from the actual occurrences of the simultaneous appearance of the objects in the same image data.

Where the personal electronic device is used to generate a database with 3D data and/or additional information, the personal electronic device may provide a user interface to receive input from a user. For example, the personal electronic device may provide a document with text boxes or other input items for requesting and/or receiving from the user identifying data (e.g., the name or type of object) and/or additional information known to the user. FIG. 3 describes a web document with input boxes for receiving input from a user describing a particular target object 222. The web document can provide input box or other feature that allow a user to input any useful information. The document may request input information related to the name 232 of the object, or alternatively an object category or object type, which can be stored as object identification data in a database. The web document may also include an input box 234 for receiving website data such as URLs to view information about the object or purchase the object. The web document may include other boxes 236 and 238 to receive additional information such as cost of object or manufacturer. In alternative embodiments the web document may include boxes where the name of the input may be defined by the user (e.g., the user may select the type of additional information and input the information). The web document may also include a search feature (e.g., search in box 234) that allows a user to perform a search for information and select it from a drop down menu or pop up box. The additional information may also include location data such as GPS data that is derived from a portable electronic device where the image data was collected or may be input by a user.

In some embodiments, user's may provide additional information of other input to the database by browsing the database and adding information. For example, in some embodiments, the user may perform a text search of the additional information or identifying information or simply browse models of the objects to find an object or profile of interest and add additional information to the database entry (i.e., the profile of the object). The user can provide any information that another user may find useful or interesting. The additional information may be provided by members of a social network and the information provided may be associated with a the social network profile of the individual providing the information. In yet another embodiment, user's may create profiles of objects that lack 3D data and other user's searching the database may provide the 3D data. For example, a first user may create a database entry or object profile that identifies an object and provides additional information. A second user searching the database may scan an object (i.e., capture image data and generate a 3D model) and identify the scanned object as matching the profile in the database that lacks 3D data. The scanned object can then be used to provide 3D data to the database for the particular database entry.

In some embodiments the same type of device may be used to create the database as used to identify objects in a search. In a preferred embodiment, the device used to generate the 3D model for creating the objects in the database and for performing searches of the database is a personal electronic device such as but not limited to a portable electronic device such as a mobile phone or tablet computer. The imaging components from mobile phones and tablet computers typically use a CMOS sensor and similar optical systems. Thus, the distortions and artifacts in the image data from different mobile phones and tablets will be much more similar than distortions and artifacts when comparing a scan from a mobile device to a scan from magnetic resonance imaging, for example. The use of the same types of imaging devices to create the database as used to perform the searching improves the accuracy and likelihood of a proper match, even if the scanning in both instances is low quality. In some embodiments the imaging component of the mobile device has an image sensor of 85.36 mm$^2$ or smaller (Nokia 808 smartphone has a 85.36 mm$^2$ image sensor, which is the largest image sensor of smartphones in widespread use).

To perform a search of a target object (i.e., an unidentified/unknown object), the personal electronic device is used to capture image data of the target object. The image data of the target object is then used to generate 3D data (e.g., using 3D modeling). The 3D data generated from the target object needs to be sufficient to identify the target object as comparable to a particular object in the database of objects. The 3D data may include one or more distances between physical features of the target object. Where the actual size of the target object is calculated, a fewer number of features need to be identified and/or distances between features calculated to uniquely identify the target object. The features identified may be distances between surfaces of the model or other features of the target object and database object. Preferably performing a search includes comparing at least a plurality of distances between features of the 3D model of the target object to features of the objects in the database.

The search result can generate an identification of a specific product or a category of products, or both.

The search result can include additional information from the database and/or provide links to web documents with additional information associated with the identified object. The search result may also include an advertisement contextually related to the object, identifying information, and/or additional information associated with the object in the database.

In some embodiments, the database and/or corresponding search can include a hierarchy of object groupings. For example, objects can be grouped into groups such as "consumer goods" "enterprise goods" "household goods", etc. By way of example, more specific groupings may be "electronics" and even more specific "phones" and more specific "Apple iPhones" and even more specific "iPhone 5." The foregoing categories are not limiting of the invention. Those skilled in the art are familiar with methods for categorizing objects into a desired database structures. Generic groupings include broader categories of objects while more specific groupings include species of object that fall within the generic groups. In some embodiments, objects can fall within multiple groupings at a similar level. In some embodiments, the hierarchy is at least 2, 3, 4, or 5 deep. The search result can return a single level of grouping or multiple levels of grouping.

Figure 4:
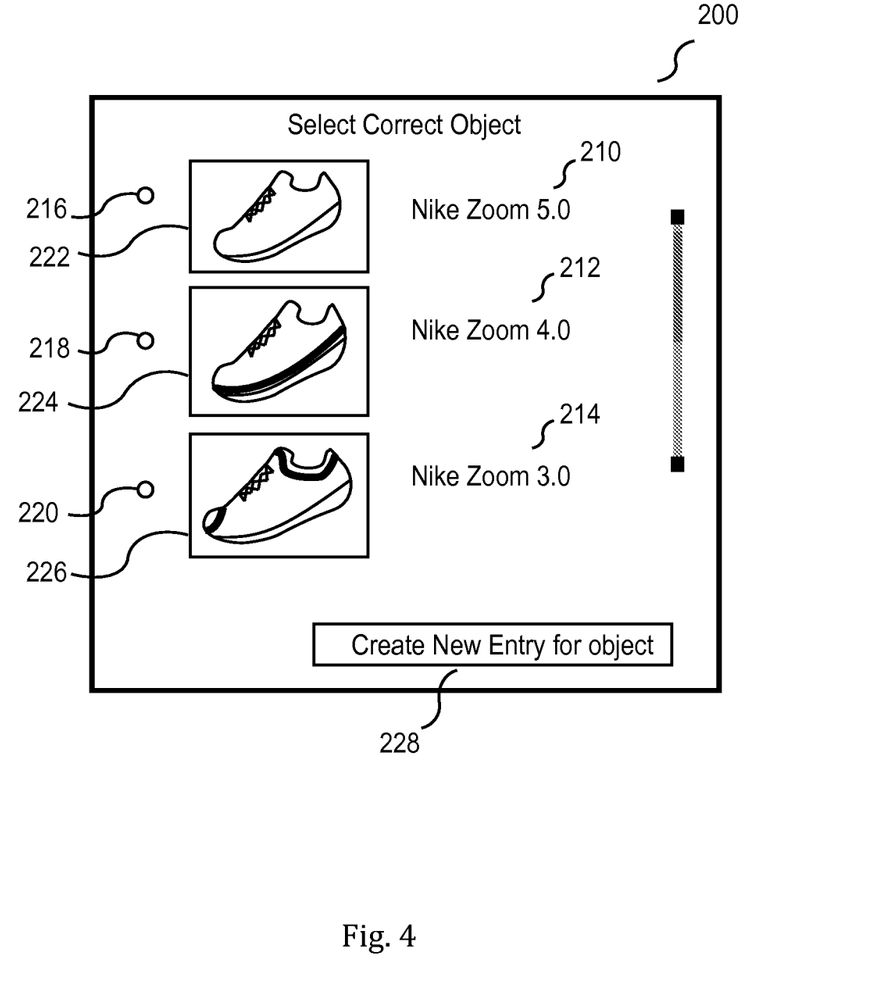
FIG. 4 describes a web document with search results using a 3D model.

In some embodiments, the search result can include a plurality of search result items that include images of objects that are identified as relevant. The user may then select from a list of search result items the object (e.g., by selecting a link). The selections may be used to improve future search results. For example, the 3D modeling of the target object may be used to identify features that distinguish it from other search result items displayed to the user and not selected. FIG. 4 shows a search result where 3D data is used to produce a list of potential target objects. The list of target objects includes objects 222, 224, and 226. A selectable radio button 216, 218, and 220 is adjacent the respective images of target objects 22, 224, and 226. The user can then view the potential target objects and select from the list. Additional target objects can be viewed in the list by scrolling (e.g., using scroll bar 227). Searches for the same object by multiple users can produce data that is used to refine the 3D data to provide more accurate search results for subsequent searchers. If target object does not appear in the list, the user may select button 228 to create a new entry for the target object.

In some embodiments, the client software providing the search results can include a model of the product and selectable links that direct a searcher to a document (e.g., a web-document) that provides additional information about particular parts or features of the object. The additional information may be provided by a third party content provider. Web document 200 or documents showing individual target objects may be displayed to third party users to receive input information.

Figure 5:
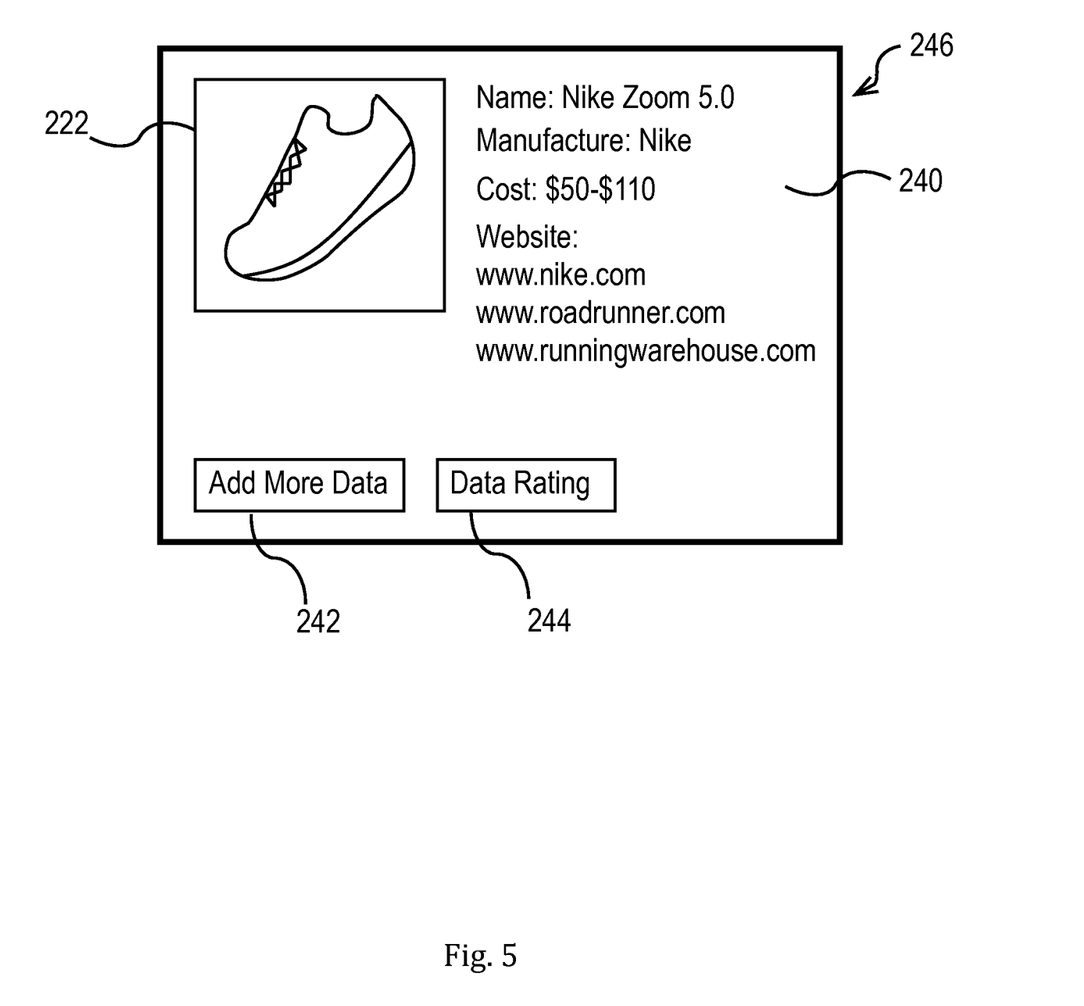
FIG. 5 describes a web document displaying information about a target object.

FIG. 5 shows a web document with results for target object 222 that displays to a searcher additional information 240. Additional information 240 can include selectable links. Selectable button 242 allows the searcher to add more information to the entry associated with target object 222. Button 244 allows users to rate the information or provide additional details about the information provided.

The features used to identify the object include at least one 3D feature, but can also include other features such as surface textures, colors, reflectivity, IR spectra, GPS coordinate, etc. (GPS coordinate can be used to identify the location and then predict based on the type of location what items may be at that location (e.g., a home vs a grocery store vs. a beach).

In one embodiment, the database is created using a neural net to identify 3D model features or combinations of 3D model features that most quickly and/or accurately identify an object and/or its category. In this embodiment, identifiable features are determined using a neural net, where the neural net is provided with multiple instances of objects in different conditions or settings and the neural net is programmed to vary parameters of the identifiable features to determine one or more sets of particular parameters that can be used to uniquely identify particular objects. In some embodiments, the identifiable feature may be an extractable feature from image data.

In one embodiment the database of objects, categories of objects, and/or identifiable/extractable features is derived in part from social network data. The social network users provide scans of objects and those scans are used to create the database of objects and used to identify objects in images of other social network users. Social network users that scan the same or similar objects can be connected in the social network.

Other embodiments of the invention relate to using 3D modeling to identify one or more features of the object and then performing a search based on the identified feature and returning a search result with a plurality of search result items that match the searched feature. The user can then select one of the search results to obtain additional information. The selection of the search results from previous searches is then used to identify matches between searches and known objects in subsequent searches. In this embodiment search is enhanced from knowing which selections a person is likely to make when certain features are identified in an object. This allows the search results to be more relevant and for the user to properly select the desired search result.

In some embodiments a neural net is used to determine which features of an object are most likely to generate a unique result when a search is performed to identify the same or a similar object. In this embodiment a neural net "learns" which identifiable features are capable of uniquely identifying a particular object or category of object. Although not required, the identified features preferably include a 3D feature.

The search result may include links to webpages or similar documents that provide information about the identified object or category of object. An advertisement can be displayed with the selectable link and the advertisement may be contextually relevant to the search object.

When receiving a search request from a user, the personal electronic device may provide a location where the image data was collected that created the 3D model. The location can then be used in part to narrow the possible search results and/or to provide more relevant results. For instance, the location can be used to identify objects that are likely to be in a home, business, park, theater, national park, etc. Some or all of the search results may be of objects that are expected to occur in the identified location.

In some embodiments, the object to be searched can be indicated by a user in image data collected on the personal electronic device. For example, where the search is performed by first collecting video, the video can be analyzed to identify a plurality of objects in the video and then the user can identify the object to be searched by selecting an object in the video. The video can indicate selectable objects with highlighting. In some embodiments the image data (e.g., video or picture) can be displayed on a personal electronic device and the image panned or zoomed to allow the user to more easily select an object to be searched. The user can zoom in and out to make the target object (i.e., the object that the user wants to search) to be a significant portion of the screen (e.g., span at least at least 15%, 25%, 50%, or 75% of at least one, two, or three dimensions). The image is analyzed (optionally in real time) for boundaries of possible objects. The boundary or other feature of an object can then be selected by the user to indicate the object that they want to search. Those skilled in the art are familiar with methods for categorizing objects into a desired database structure.

In some embodiments unselected objects in the field of view can be identified and used to give context to the search. For instance if an unselected object co-existent with the searched object can be identified, properties of the known object may be used to rank or narrow the search for the searched object. Objects that are found in the same imagery often provide valuable context for identifying an object and a less accurate 3D model may be needed to identify the target object. For instance a picture of metronome on a piano can be identified more accurately and quickly even if the metronome is partially obstructed by knowing that pianos and metronomes are contextually related and identifying the piano as a non-selected object in the image data.

In some embodiments the portable electronic device may be configured to provide feedback to a user to indicate which portions of an object require additional scanning to obtain a desired resolution.

While the preferred embodiment requires obtaining 3D data of the target object, some embodiments of the invention can be carried out using 2D data. The actual size of a body part in a picture can be used to identify objects in a 2D picture. In some embodiments the size of the body part may be obtained by identifying a person in a picture and obtaining body part sizes associated with the identified person. By knowing the size of a hand or face or body of a person in a picture, the size of another object can be derived (e.g., a pair of skis) and the object more easily identified. The sizing can be of a leg, torso, face, hand, arm, etc. The sizing can be derived even where a person has cloths on by identifying pivot points on the person (e.g., from a bent knee and upper leg create pivot points at the waste and the knee. In some embodiments an object from a 2D picture can be identified by comparing it to a database of 3D object models. Thus, the angle of the picture in the 2D model can still turn up a kit because the matching can be performed at different angles. Having an approximate actual size of a body part or other object in the image significantly reduces the complexity of identifying a match of a 2D object in a database of 3D models. Of course the invention also includes using 3D imaging data captured from a personal portable electronic device and comparing it to a database of 3D models to identify a match and provide an advertisement contextually related to object in the image data. However, obtaining 3D images is currently much more difficult than obtaining a 2D image. Examples of methods include techniques disclosed in publication by Huanghao Xu, titled "Measuring Accurate Body Parameters of Dressed Humans with Large-Scale Motion Using a Kinect Sensor," Sensors 2013, 13, 11362-11384; and "Home 3D Body Scans from Noisy Image and Range Data" by Alexander Weiss, published by 2011 IEEE International Conference on Computer Vision (ICCV), Nov. 6-13, 2011; and Human Model fitting from monocular posture images, by Daniel Grest, Proc. Vision, Modeling, Visualization, 2005. All of the foregoing are incorporated herein by reference.

Identifying Actual Size

In some embodiments, the object can be identified in part by estimating the actual size of the object being searched. The actual size can be estimated by identifying a feature of known size in the imaging data. The estimated actual size of an object may provide important data for distinguishing between different species of the same type of object and for improving the accuracy and/or speed of the search and/or for reducing the computational power needed to provide an accurate match. For example, there are many personal items (e.g., skis, gloves, hats, shoes, clothing, toys, tools and the like) that come in different sizes may appear to be dimensionally identical (i.e., identical in terms of the relative dimensions). Deriving the estimated actual size of the target object being identified or searched can be obtained by receiving image data that includes an object with at least one feature of known size. In one embodiment, the object with a known dimensional size may a body part of a person (e.g., a hand or face). Examples of method for generating an estimate of the actual size of a body part are described in Applicant's co-pending patent application Ser. No. 14/072,185, filed Nov. 5, 2013, titled Body Modeling and Garment Fitting, which is hereby incorporated herein by reference in its entirety. In some embodiments, the object may be a body part of the person requesting the search (and/or be a personal object owned by the search request user). In some embodiments, the actual size of an object may be identified by displaying a reference image with a known dimensional size on a personal electronic device (e.g., a QR code or bar code). The dimension of the reference image may be known by identifying the image size and screen size of the device displaying the reference image. The reference image and the searched object are then placed in proximity for the 3D sensor scanning Displaying the reference image and sensing the searched object and reference image at the same time can be accomplished using two separate electronic devices for displaying the reference image and sensing the reference image for use in 3D modeling. Alternatively, the same electronic device may be used if the searched object (i.e., target object) and the reference image are captured in a mirror. The reference image and the target object can bounce off the mirror and back into the device displaying the reference image.

In another embodiment, a person may use their finger or other body part to provide a reference object of known dimensional size. For example, a person sizing a target object (e.g., by modeling the target object) may point to the target object and capture image data of the target object and the hand pointing to the target object. An electronic device analyzes the image data and recognizes the hand as a reference object and obtains the size of the hand from a database and uses the stored size to estimate the size of a target object.

The personal electronic device may also determine an object to be identified through a gesture derived from the image data. For example, the direction in which a finger is pointing may be used to identify an object being pointed to as a target object. The target object may be highlighted in the imagery being displayed to the user on a personal electronic device. The highlighting may be circumferential marking such as a dashed line around the target object or the highlighting may be coloring or shading effects of the object itself. In some embodiments the reference object (e.g., hand or finger) may be highlighted using a different technique than the target object (e.g., shading for reference object and dashed lines for the target object). In some embodiments, the highlighting may be selectable by a user (e.g., similar to Adobe's lasso tool in Photoshop) and/or the user may verify the correct reference object and/or target object have been segmented in the imagery.

Figure 6:
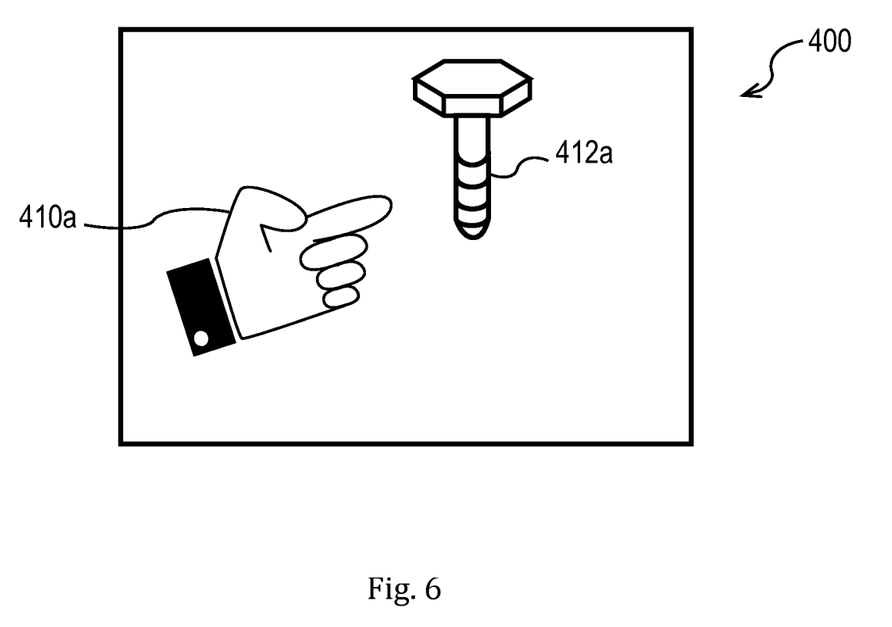
FIG. 6 illustrates a photograph with a reference object and a target object.
Figure 7:
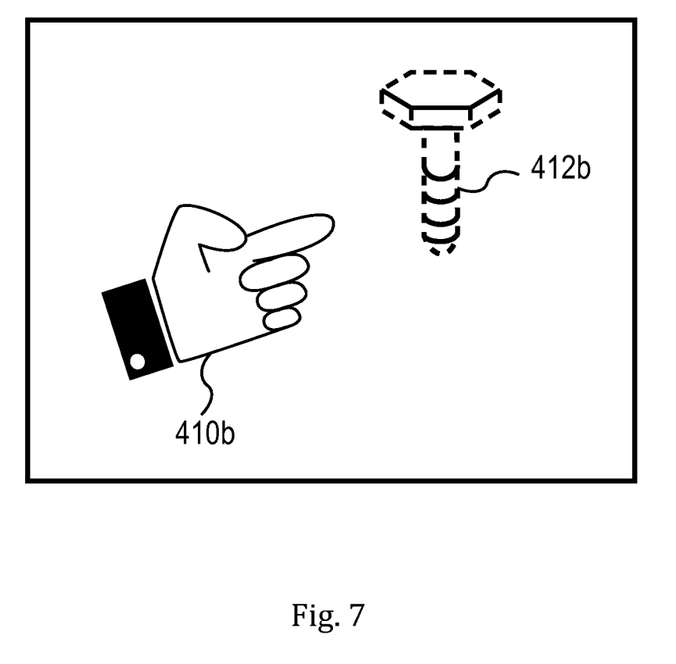
FIG. 7 illustrates the photograph of FIG. 6 with the target object highlighted.

FIGS. 6 and 7 describe a photograph 400 that include a reference object 410*a* and a target object 412*a* (not drawn to scale). The size of features of hand 410*a* can be stored and used to scale the size of target object 412*a* when the two objects appear in the same image data. FIG. 7 shows target object highlighted with dashed lines at the boundary.

Embodiments of the invention also include software such as a mobile app that allows a user to measure objects using a body or body part. For example, the user may use a mobile phone (e.g., smartphone) and their body part (e.g., a hand) as a "electronic tape measure" for an object. The body part and the object are captured in image data and the size of the body part is used as a reference object to derive or scale the target object to the actual size.

The 3D data (i.e., model data) of the reference object and/or the size information for the target object may be stored and/or added to a database for use as a reference object (i.e., data obtained for target objects may be used as a reference object data for future searches). The target object data may be stored locally on a personal electronic device or on a server computer (local or cloud storage).

Additional details for generating the actual size of an object using images are described in Applicant's U.S. Pat. Nos. 8,655,053 and 8,908,928, which are incorporated herein by reference.

In some embodiments, the estimated actual size of the searched object is obtained by measuring movements of the imagining device (e.g., using an accelerometer).

Also, the accelerometer data can be made more precise by performing the calculation multiple times for different frames of video data. The calculated distance is compared to a static feature of the image data and the variation in the size of the static feature based on the calculated distance from the accelerometer data is used to calculate an error factor in the accelerometer data for multiple calculations. The magnitude of the error factor can then be plotted on a curve which produces a distribution of the magnitude of the error. The maximum of the distribution of the error factor has the highest probability of being the actual error factor. The error factor can be calculated and plotted for 2 or more, 10 or more, 100 or more, 1000 or more different calculated accelerometer measurements between frames. The accelerometer may also include an electronic compass to assist in orienting the accelerometers relative to the surface of the earth.

In some embodiments, the foregoing embodiments can be used in combination with a time of flight 3-D imager to determine the distance an object is from a camera and/or to facilitate determining the actual size of an object. The TOF imager can be used alone or in combination with an accelerometer and/or an object of known dimension to calculate the actual size of an object. Time of flight imagers use the travel time of emitted light to measure the distance the object is away from the image sensor. An example of a suitable time of flight imager that can be used in the present invention is Infineon's IRS10x0C (IRS1010C and IRS1020C) or its related CamBoard pico, a 3D camera product.

In some of the embodiments described herein, the identification of objects in a photograph can be used to provide advertising. In some embodiments, the photographic data may be obtained from a social network and objects in image data from a social network may be identified using reference objects also identified in the same image data.

Identifying Actual Color Property

Some embodiments of the invention relate to identifying an actual (i.e., true) color property of a target object by identifying a known object (i.e., reference object) with a known color property in the same imagery with the target object. The color property may be a hue, tint, shade, tone, or temperature. The known color property may be obtained from any object that has known true color properties and can therefore serve as a true color source. The true color source may be a printed document that has known color properties. Alternatively, the color source may be a display such as a smart phone that displays known true color properties on the display. In yet another embodiment, the reference object may be any object imagery where a color property has been established using a true color source.

The reference object (i.e., object with known color properties) can then be used to identify the true color properties of a target object in image data that includes both the target object and the reference object.

Once an actual color property of a target object has been determined, the actual color property may be used to properly display the target object or the actual color property may be used in part to identify the target object. For example, the actual color property may be stored in a database of known objects and used as a parameter for matching target objects with known objects in a database.

The color property may be stored in a database similar to the database shown in FIG. 2, except that information related to color property may replace or be added to 3D object data.

The identification of the object in part or in whole using an actual color property may be used to search for information about an object (e.g., information stored in a database in association with the known object). The associated information may be displayed to a user upon identifying a match between the target object and a known object in the database. An advertisement may be displayed with the associated information and the advertisement may be contextually relevant to the associated information and/or the searched object and/or the advertisement may include a hyperlink to additional advertising information. While the foregoing method of identifying actual color of an image has been described in the context of identifying objects, the invention also extends to producing proper colors in printed photographs or electronic photographs to be displayed on an electronic display.

Methods for Acquiring Product Data for Use in Doing a Search

In some embodiments the invention include personal electronic device that allows an acquisition user to scan products into a database for future use in search. The personal electronic device includes a software application that provides a user interface for acquiring data for creating a 3D model of an object. The acquisition user performs a scan and provides information about the scanned object. The information can include location of the object, category of object, date on which the product was available at the location, the seller or owner of the object, packaging, shipping, and/or physical condition of the object, etc. The personal electronic device may be a smartphone or tablet computer with an image sensor for collecting the data. The user may be provided an account through which attribution can be made to the acquisition user.

The acquisition user may be an agent of the supply chain for the product, including, but not limited to a manufacturer, distributor, or merchant. Alternatively, the acquisition user may be an industry insider or a customer. In some embodiments, the acquisition user (i.e., content provider) can be paid from revenue generated from individuals searching for and/or buying products. The acquisition user can be paid a portion of advertising revenue or a portion of a transaction fee associated with the sale of a product. Where multiple individuals contribute to describing or scanning a product, the revenue paid to the acquisition users can be determined according to the information that is most significant in inducing the searcher to view information about a product or purchase a product. For example, the client software displaying the product content to the searcher may track which information the search user views and/or how long it is viewed to determine the content that was relevant to the search user. In some embodiments, a database of products may include multiple scans of the same or a similar product and when a searcher provides a scan for a match, the content provider that provided the scan that most closely matches the searchers scan can be attributed with being the content provider.

In some embodiments, manufacturers, industry insiders, merchants or customers may provide the content for additional information. While the additional content is preferably provided in combination with a 3D model, the information can be received from a content provider and provided to a search result without a 3D model or even a model of the product. However, providing a model is highly advantageous because it can give a visual representation of the product that is readily identifiable.

In some embodiments, additional information about an object can be obtained from a scan of a receipt from a business establishment. In this embodiment, an image sensor (e.g., a camera on a smart phone) may be used to take a picture of a receipt, product brochure, product advertisement, etc. The image data is then processed to extract information on the receipt is identified (e.g., a type of object, object price, merchant name, date, etc.). In some embodiments, the receipt may be saved as an image associated with the object instead of or in addition to scraping data from a picture of the receipt.

In some embodiments, the product data may include size information about the size of one or more feature of an object stored in the database, which can be used to match a product that is searched or scanned in a way that produces an estimate of an actual size of the target object. The library of data for performing matches can be scanned in a similar way as the target objects being identified (i.e., searched) as described herein, including extracting size information from an object of known dimension that is in the same image as the product being scanned or using accelerometer data captured simultaneously with the image data used to create the model of the scanned product.

In addition to identifying objects using image data or modeling, a computer system may provide a network for requesting and/or receiving content related to the scanned object. The system may include a user interface that allows a user to input the information. In some embodiments, the system described in US Patent Publication 2012/0254760 to Meeker may be used to obtain information about objects in a database including object models. US 2012/0254760 is hereby incorporated herein by reference.

Games for Producing Data

Some embodiments of the invention relates to using a social network to collect information about local establishments. In one embodiment, social network users check into a location and provide information about the goods and services available at that location. For example, social network users may use a personal electronic device such as a smartphone or tablet and "check-in" at locations using the location services on the portable electronic device. Additional information about methods and systems for producing games where user's check in at locations using portable electronic devices is disclosed in U.S. Pat. No. 7,593,740 to Crowley, which is hereby incorporated by reference in its entirety. The users may receive scores or prizes for checking in or providing information related to products located in a particular store or location. In one embodiment, the additional information about an object may include pricing. The collection of the data may be a contest in which users that supply the most data and/or are the first to supply a change in the data outcompete their competitors in the game.

In a second embodiment, a game provided on an electronic device includes scores based at least in part on the number of products the user scans in a location or by identifying products that have not yet been scanned or have changed in some way (e.g., price increase or decrease). In some embodiments a user is provided with software that allows the user to scan any object, but requires input from the user regarding the category of object being scanned. The name of the object provided by the acquisition user can be used to understand what features make different objects similar. This can also be used as input for a neural net. In some embodiments, this searching game can give someone a list of categories to select from using similar features to past searches. In addition to getting 3d features from the game, you could also let the users put the objects into a video game to give incentive to play the game. Then use data such as user indicated category or context of placement of the object to categorize the object and use the categorizing and/or features of the object to build the search engine database.

Some embodiments include incentives for users to scan products. For example, a video game that includes throwing or catapulting objects may allow a user to scan objects that populate a database for use in search. The scanned or modeled objects can then be used in the video game as well and/or provide improved performance in the video game as an incentive to provide scans of objects to populate or verify the accuracy of images in the database. In some embodiments, users can be awarded points for scanning objects.

In an alternative embodiment, the video game includes simulated real life goods that are purchased and the purchase price depends on scanning the price of a good and/or scanning the good in a particular location with a known price.

In an alternative embodiment, a 3D model of a object (e.g., person or chattel) may be captured and then incorporated into a video game. The model of the real object may be implemented into the game as a video game object. The video game object may be thrown or otherwise manipulated by a character in the video game (i.e., the object is not merely a graphic that represents the video game player). The object may be an object that belongs to the video game player. The model of the object is preferably generated using a personal electronic device such as a mobile device.

Product Map and Social Network Connection (Geoproduct)

Some embodiments relate to a map of products that have been scanned from a personal electronic device. The map can be a geographic map or a timeline or both. The geographic map may show where a product was scanned or where it is located or where it was manufactured or sold or owned or a combination of these. The timeline may show when a product was scanned or otherwise identified as existing. The product map may also be associated with individuals of a social network to show who owned, sold, bought, scanned the product, and/or provided information about the product that is associated with a scanned product in a database.

The product map can be stored in a database and displayed on a user interface by accessing a computer network. The Product map can be displayed as a product page that includes information about where and/or when a product was manufactured, sold, bought, distributed, etc. For instance a map can include a plurality of dots indicating a location for any or all of the foregoing. The user interface can allow a user to selectively display locations where the item has been sold or where its location with customers. The different types of locations can be displayed separately or together. Where the separate locations are displayed together, different indicators can be used on the map to indicate different types of positional data.

The product map may also provide product information such as ratings, warrantees, versions of the product or changes over time, etc.

The product map may also include connections between product manufacturers and consumers. Users may scan the products in the store or manufacturing facility and indicate this information in a product profile. The users can also add to a product profile to identify shipping channels for a product.

The product profile is distinct from current databases of goods in one or more of following important differences: (i) the scanned products may be stored in an account that can be modified by the users or the public (ii) product scans of the same product at different locations may be associated in the account and/or with the particular individuals or entities that produced the scans; (iii) the product information may include a location with the product was scanned (e.g., geocoordinate or location of the person uploading it or the manufacturing location, store location, etc.), and/or (iv) the profile may be associated with a social network that includes scanning products.

Where a timeline is includes, the products may be displayed on a timeline and the display of one or more products on the timeline may change as the user selects a particular time (e.g., the timeline may have a slider that allows selection of the a date and the display of a product may change as the date is selected.

In some embodiments, a product profile includes versions of the product that are defined by the public or users (i.e., in a wiki document). Products can be associated in the product map or product profile according to certain similarities (e.g., manufacturer, product type, date of manufacture, etc.). The interface allows users to establish versioning rules and/or identify products as being linked due to being a version of another product. Although not required, in some embodiments the versioning can be systematic. For example, the version number may be selected according to date of first sale or manufacture. The versioning can be organized in part by manufacturer and/or vender.

The versioning may be represented graphically on a time line. For instance, different versions can be displayed as different markings (e.g., bars) on a timeline. (e.g., different colored bars or different hashings of bars).

The product map may also include pricing over time. The system can receive input from users on pricing of goods and/or search databases such as the Internet or world wide web for pricing of different versions of the products in the database. In some embodiments, the pricing as a function of time may be displayed graphically to a user in association with the product map.

In some embodiments, the system allows users to sell products or display advertisements in association with the product map. For example, a seller of products or advertisement may provide a link to the social network map for a product that the person is selling or advertising for.

In some embodiments, the product map may be associated with a social network. Social network users may scan products and view on a map the places where other people from the social network have scanned the same product and/or versions of the scanned product. Optionally the scanned product can lead a user to a blog or other social network information about that product. The search can be similar to the social network "Pinterest" except that instead of finding photographs of products on the internet, the user scans the product using a personal electronic device and provides the scan to the social network. The social network may include a link to the product page for a scanned object.

The social network may include profiles for different types of entities that handle products such as manufacturers, design engineers, distributors, and/or customers. The social network may identify the type of entity in association with the particular products in the social network.

In some embodiments, the social network interface can allow a user to contact a professional in a supply chain of a product in the social network to request that the professional provide similar services for a different product.

The computer implemented methods may also provide a search engine and/or advertising server for searching and/or placing advertisements (including contextually relevant advertisements) for products and/or individuals in or associated with the product map and/or social network. Examples of advertising that can be associated with a map are disclosed in US patent publication 2011/0307801 to Sherman, which is hereby incorporated herein by reference.

Identifying Users Using 3D Imaging

In one embodiment, 3D imaging of body part (e.g., face) can be used for biometric sensing. Body imagining is in contrast to a retinal scan, which recognizes a 2D pattern on the retina of the eye. The 3D imaging from a portable electronic device is used to verify a user for accessing files or applications and/or changing settings in an operating system of the personal electronic device.

In one embodiment, the personal electronic device has an unlock feature that does not require a 3D scan and the 3D scan is used for verification of acts performed after the device is unlocked.

In some embodiments, 3D models for verifying users can be performed by the personal electronic device for verifying access to or contributions to a social networking application or system, an object scanning system, or a 3D object search engine or database as described herein.

While the invention related to verifying a user has been described as using a 3D scan, some embodiments of the invention relate to controlling an operating system, file system, app access, and/or settings/preferences on an unlocked portable electronic device using a biometric sensor selected from finger print scanner or retinal scanner. In this embodiment, the device is first unlocked using a first method (e.g. a swipe on a touch screen or a numerical input). The unlocked device is then used to verify the user using a secure biometric scan and verification of the user allows access to files or applications on the electronic device or a device in communication with the personal electronic device. The secure biometric scan can take longer and be less convenient than the unlock feature, but is more secure. Additional details may be found in Application 61/549,212, which is incorporated herein by reference. U.S. Pat. No. 8,600,120 to Gonion is also hereby incorporated herein by reference and the features disclosed therein can be used in combination with the features described herein.

Bike Fitting Using 3D Modeling for Sports

Some embodiments of the invention relate to generating a 3D model of a person on sports equipment (e.g., a bicycle) and identifying fitting measurements of the sporting equipment. The sporting equipment may be a bicycle, skis, snow board, golf clubs, kayak, hockey stick, tennis racket. In one embodiment, the sports equipment is not a garment. The image data may include a person and/or the sports equipment and the sizing of the equipment or fitting of the equipment can be derived from the image data. The models can include a person's head, torso, arms, hips, upper leg, knee, lower leg, and/or foot. The model of the sports equipment can include any feature of the sports equipment. For example, for a bicycle the model can include the handle bars, grips, drops, seat, crank, pedals, shoes, cleats, down tube, cross tube, bottom tube, shifters, breaks, or helmet. In some embodiments, the model may be created from images of a person on an actual bike.

The 3D modeling of the sports equipment or bicycle and/or the person may be carried out using the techniques described herein. In particular, the modeling of the person is performed using a personal electronic device such that a person may perform the modeling in a private location and with their own equipment. Where the modeling uses image data from a camera of portable electronic device, the body dimensions may be calculated by identifying landmarks such as ankle bones, knees, shoulder bones and hip protrusions to make the measurements. Some bony protrusions are more pronounced at certain positions in the pedal stroke. These protusions protrusions may be used to mark a location on skin or clothing that is then used as a reference for the anatomy of the person. In some embodiments, the rotation of a limb (e.g., the femur) about a pivot point is used to identify the pivot point. Visible markings on skin or clothing can be used to track the change in a plurality of positions of a limb. By measuring the change in the angle of the limb between two positions of the pedal stroke, the pivot point of the limb can be deduced. The pivot point will be where the extension of the limb in the two positions would intersect. Using motion data can produce very accurate angles of limbs and thus produce fitting measurements that are more accurate and even different than measurements made with a ruler. Additional features of making fitting measurements are described in U.S. Application No. 20070142177 to Clifford, which is incorporated herein by reference for its teachings that are compatible with 3D modeling that is acquired using imaging data from a portable electronic device as described herein (e.g., a camera of a smartphone or tablet computer having a touchscreen user interface). The markers on the body of the cyclist may be skin or bone features or clothing and the features may be obtained using feature extraction. Alternatively the 3D model may be generated from a light coding sensor (e.g., infrared pattern reflected off the surface of the object and detected by an infrared sensor).

The sports equipment fitting includes calculating the actual size of the equipment and/or the actual size of the person being fitted to the sports equipment. The actual calculation can be performed by identifying an object of known dimension in the image data used to create the model.

I claim:

1. A computer implemented method for measuring a size of an object, comprising:
    receiving three-dimensional image data that includes imagery of a body part of a user and imagery of a target object to be sized;
    generating a three-dimensional model of at least a portion of the body part of the user and the target object using the three-dimensional data;
    identifying in the three-dimensional model the body part of the user and the target object to be sized;
    providing an actual size of one or more features of the body part of the user;
    generating the actual size of at least one feature of the target object by scaling the one or more features of the target object to the actual size of the one or more features of the body part of the user; and
    using the actual size of one or more features of the target object to identify in a database a name, a type, or a category of the target object.

2. The method as in claim 1, further comprising using the actual size of the one or more features of the target object to identify the target object in a database of objects and provide an electronic document with pricing information about the target object.

3. The method as in claim 1, further comprising using the actual size of the one or more features of the target object to identify the target object and providing an electronic document with a selectable link to a web document related to the identified target object.

4. The method as in claim 1, wherein the imagery of the body part includes a gesture that indicates a selection of the target object, the method further comprising deriving the gesture from the imagery of the body part and using the gesture to identify the target object in the image data.

5. A computing system comprising random access memory, read only memory, and a processor, the processor configured to perform operations comprising:
    receiving three-dimensional image data that includes imagery of a body part of a user and imagery of a target object to be sized;
    generating a three-dimensional model of at least a portion of the body part of the user and the target object using the three-dimensional data;
    identifying in the three-dimensional model the body part of the user and the target object to be sized;
    providing an actual size of one or more features of the body part of the user;
    generating the actual size of at least one feature of the target object by scaling the one or more features of the target object to the actual size of the one or more features of the body part of the user; and
    using the actual size of one or more features of the target object to identify in a database a name, a type, or a category of the target object.

6. A computing system, comprising:
    a mobile electronic device comprising a plurality of cameras, a processor, and computer memory storing computer readable instructions that when executed on the processor cause the following:

capturing three-dimensional image data from the plurality of cameras, the three-dimensional image data including imagery of a body part of a user and imagery of a target object to be sized;

generating a three-dimensional model of at least a portion of the body part of the user and the target object using the three-dimensional data;

identifying in the three-dimensional model the body part of the user and the target object to be sized;

providing an actual size of one or more features of the body part of the user;

generating the actual size of at least one feature of the target object by scaling the one or more features of the target object to the actual size of the one or more features of the body part of the user; and identifying in a database a name, a type, or a category of the target object using the actual size of one or more features of the target object.

7. The computing system as in claim 6, further configured to use the actual size of the one or more features of the target object to identify the target object in a database of objects and provide an electronic document with pricing information related to the identified target object.

8. The computing system as in claim 6, further configured to use the actual size of the one or more features of the target object to identify the target object and provide an electronic document with a selectable link to a web document related to the identified target object.

9. The system as in claim 6, wherein the imagery of the body part includes a gesture that indicates a selection of the target object, the system configured to derive the gesture from the imagery of the body part and use the gesture to identify the target object in the image data.

10. A computing system, comprising:

a mobile electronic device comprising a plurality of cameras, a processor, and computer memory storing computer readable instructions that when executed on the processor cause the following:

capturing three-dimensional image data from the plurality of cameras, the three-dimensional image data including imagery of a body part of a user and imagery of a target object to be sized;

using the three-dimensional data to generate a three-dimensional model of at least a portion of the body part of the user and the target object;

identifying in the three-dimensional model the body part of the user and the target object to be sized;

providing an actual size of one or more features of the body part of the user;

generating the actual size of at least one feature of the target object by scaling the one or more features of the target object to the actual size of the one or more features of the body part of the user;

using the actual size of the one or more features of the target object to identify in a database a name, a type, or a category of the target object;

identifying an electronic document related to the identified target object; and providing the identified electronic document to the user.

11. The computing system as in claim 10, wherein the plurality of cameras includes a light coding sensor.

12. The computing system as in claim 10, wherein the mobile electronic device is a smartphone.

* * * * *